March 7, 1967 J. L. BOSTWICK 3,307,661
AUTOMATIC BRAKE ADJUSTOR
Filed March 29, 1965 2 Sheets-Sheet 1

INVENTOR.
JAMES L. BOSTWICK
BY
Paul A. Weilein
ATTORNEY

March 7, 1967 J. L. BOSTWICK 3,307,661
AUTOMATIC BRAKE ADJUSTOR
Filed March 29, 1965 2 Sheets-Sheet 2

INVENTOR.
JAMES L. BOSTWICK
BY
Paul A. Weilein
ATTORNEY

United States Patent Office 3,307,661
Patented Mar. 7, 1967

3,307,661
AUTOMATIC BRAKE ADJUSTOR
James L. Bostwick, 1501 Bluff Drive,
Santa Barbara, Calif. 93105
Filed Mar. 29, 1965, Ser. No. 443,415
12 Claims. (Cl. 188—196)

This invention relates to vehicle brakes and more particularly to an automatic slack adjustor unit for such brakes.

It is an object of this invention to provide a novel and highly efficient slack adjustor of simple and inexpensive construction for automatically adjusting the brakes associated therewith in response to the presence of slack in the brake system.

It is another object to provide as one form of this invention an actuator attachment for the brake operating arm of a known manually operable slack adjustor in such a manner that slack adjusting means embodied in the arm will be operated automatically to adjust the brakes in response to overtravel of the arm such as caused by wear in the brake shoes or due to slack otherwise present in the brake system, no change in the construction of the slack adjustor arm and brake adjusting means therein being required except the removal of the shaft in the brake adjusting means of the arm and the substitution of a shaft having slightly greater length than the one removed.

It is another object hereof to provide a slack adjustor of the character described in which the desired simplicity and inexpensive construction as well as efficiency are achieved by providing in association with the brake operating arm of the slack adjustor unit a plunger, spring means biasing the plunger to a predetermined position, and a flexible anchoring element connected with the plunger and anchored at a point spaced therefrom. Operating means of simple form is provided in operative connection with the plunger and brake adjusting means in the brake operating arm in an arrangement such that should the brake operating arm travel beyond a predetermined extent in applying the brakes, the flexible element will hold the plunger against movement with the arm. Upon release of the brakes as takes place with opposite movement of the arm, the spring means will bias the plunger to the predetermined position so as to actuate the operating means to effect actuation of the brake adjusting means in the arm, and thereby compensate for the slack in the system and maintain the brakes in good condition.

Further, it is an object of this invention to provide an actuator device such as above described wherein the operating means which responds to spring biased movement of the plunger, is of novel and inexpensive form consisting of a pawl on the plunger and a ratchet wheel on a portion of the manually operable shaft of the brake adjusting means. With this arrangement, the spring biased movement of the plunger causes the pawl to engage the ratchet wheel and to turn the same and the shaft so as to operate the brake adjusting means to compensate for slack in the manner hereinbefore described. The pawl and ratchet are constructed so that the shaft may be manually rotated in either direction to adjust the brakes while the actuator device is in operative association with the arm.

Another object of this invention is to provide an actuator device such as described wherein the flexible element which is anchored on a stationary structure at a point spaced from the plunger, carries spring means of greater strength than the spring means which biases the plunger, so that should the flexible element be anchored in a manner such that it does not have the length necessary to permit overtravel of the arm in applying the brakes, the spring means carried by the flexible element will yield and thereby permit of necessary movement of the arm without causing damage or dislodgement of the actuator device.

Other objects and advantages of the invention will be hereinafter described or will become apparent to those skilled in the art, and the novel features of the invention will be defined in the appended claims.

Referring to the drawings.

Figure 1:
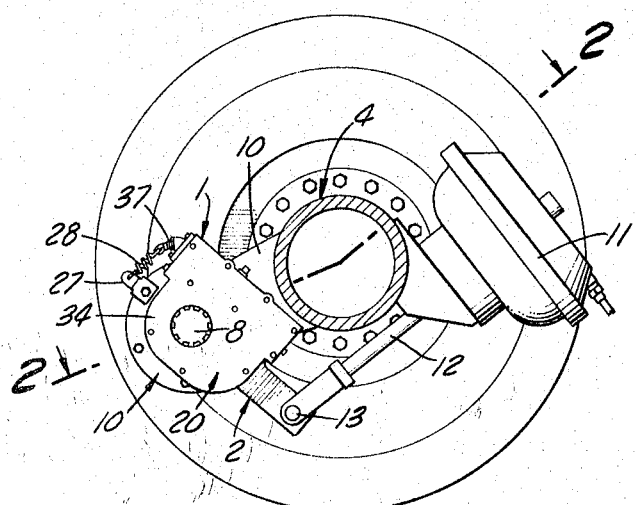
FIG. 1 is a side elevational view of a brake adjustor device embodying the present invention.
Figure 3:
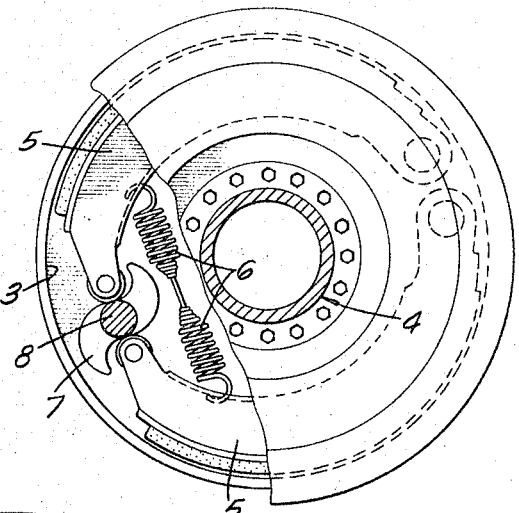
FIG. 3 is a cross-sectional view taken on the line 3—3 of FIG. 2 with parts broken away and other parts shown in elevation for clarity of illustration.

In the accompanying drawings, there is shown an actuator device 1 embodying this invention mounted on the slack adjustor and brake operating arm 2 of a conventional brake unit. This unit includes a brake drum 3 supported on an axle 4 and provided with brake shoes 5 held in releasing position by spring means 6. Cam means 7 are operable to move the shoes for applying the brakes in response to turning of the cam shaft 8 supported by a bearing 9 in turn supported by bracket 10 fixed to the axle. The arm 2 is fixed to the shaft 8 for turning the same to apply and release the brakes, the arm being actuated by a power cylinder unit 11 having an operating rod 12 pivoted as at 13 to the arm.

The slack adjustor and brake operating arm 2 is conventional and includes the usual manually operable means for adjusting the brakes. This adjusting means includes a worm gear 14 rotatably supported in suitable bearings, not shown, in the hollow interior 15 of the arm 2 and splined as at 16 on the shaft 8. A worm 17 meshing with the worm gear 14 is mounted on the rotatable shaft 18 journalled in the arm 2. One end of the shaft protrudes as at 19 from the arm 2 so that it may be engaged and turned for manually adjusting the brake shoes. The shaft 18 is held against unintentional movement by means of spring-loaded detent means 18′ shown in dotted lines in FIG. 4.

In accordance with the present invention, the actuator device 1 is attached to the arm 2 and operates in response to predetermined movements of this arm to actuate the brake adjusting means including the shaft 18, worm 17, worm gear 14, shaft 8, and cam means 7.

Figure 4:
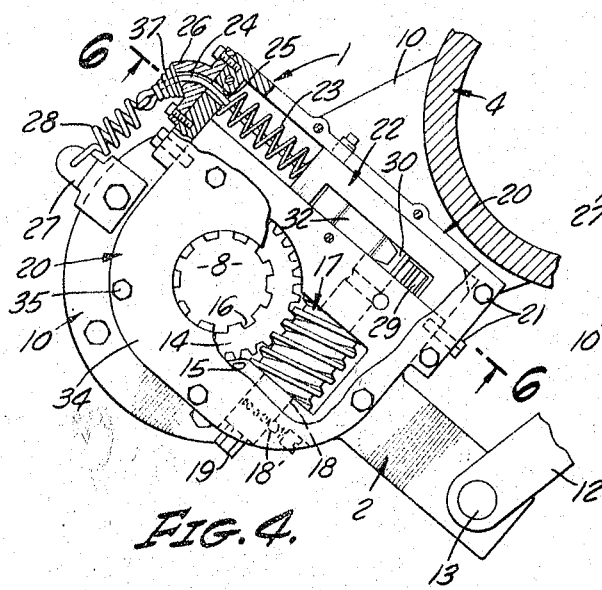
FIG. 4 is an enlarged fragmentary side elevational view partly in section of the actuator device of this invention as applied to the manually operable slack adjusting arm with a part of the latter broken away for clarity of illustration, all parts being shown in the position in which they are disposed when the brakes are released.
Figure 5:
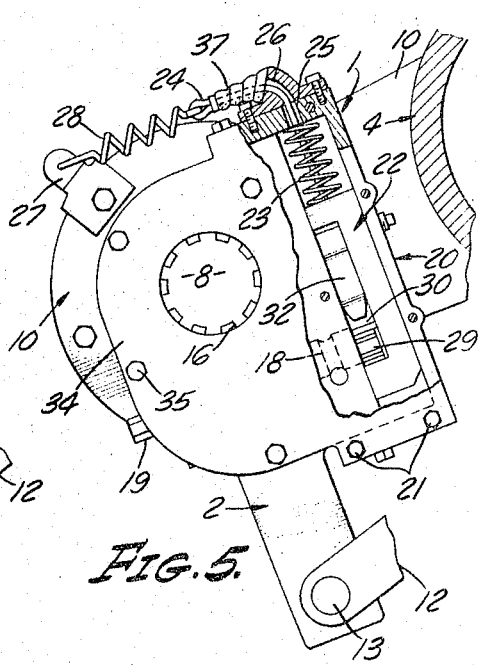
FIG. 5 is an enlarged fragmentary side elevation and part sectional view corresponding to FIG. 4 showing the actuator device of this invention as it would appear when ready for automatic operation to actuate the brake adjusting device in the slack adjusting arm to which it is attached.

As shown in FIGS. 4–8, the actuator device includes an elongate housing 20 secured by fastenings 21 to the arm 2 so as to move therewith when the arm is moved in opposite directions in applying and releasing the brakes. In the housing 20 is a plunger 22 biased by spring means 23 to occupy a predetermined position at one end of the housing. Also in the housing and operatively connected with the plunger and brake adjustor shaft 18 in the arm 2 is operating means M which, in response to relative movement of the housing and plunger, will turn the shaft 18 and thereby bring about adjustment of the brakes. This operating means is not operable while the arm 2 is moved to apply and release the brakes when there is no slack in the brake mechanism and the arc of movement of arm 2 is comparatively short. However, upon wear of the brake shoes or due to some other cause, slack occurs in the mechanism and permits overtravel of the arm 2, the means M will operate to adjust the brakes. In order to accomplish this, anchoring means including a flexible element 24 which may be in the form of a steel cable, is provided and is fixed at one end to the plunger 22 and extends outwardly through an opening 25 in one end of the housing 20, thence through a guide 26 fixed on the exterior of the housing. Means 27 are provided to anchor the flexible element 24 to a stationary part of the brake unit, and this means, as shown in FIGS. 4 and 5, may include a heavy coil spring 28 which is of greater strength than the spring means 23 biasing the plunger 22. With this arrangement, the flexible element 24 will restrain movement of the plunger 22 while the housing 20 moves with the arm in the instance of overtravel of the latter sufficient to take up all of the slack in the flexible element.

Figure 8:
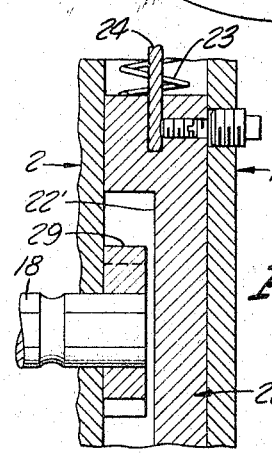
FIG. 8 is an enlarged fragmentary sectional view taken on the line 8—8 of FIG. 6.
Figure 2:
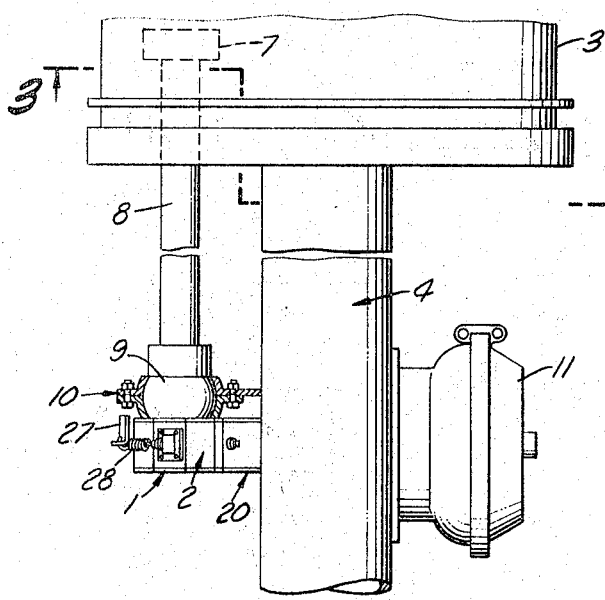
FIG. 2 is a sectional view taken on the line 2—2 of FIG. 1 showing in section and top plan the axle and brake assembly with the brake actuating device of this invention associated therewith.
Figure 6:
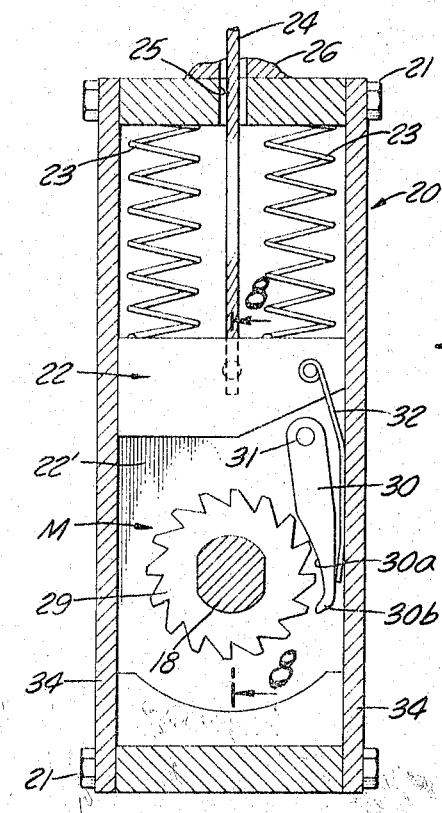
FIG. 6 is an enlarged sectional view taken on the line 6—6 of FIG. 4 particularly illustrating the spring-loaded plunger and associated means when in the normal or predetermined position in which it is held by the spring means therefor, the parts being shown in the position in which they are disposed when the brakes are released.
Figure 7:
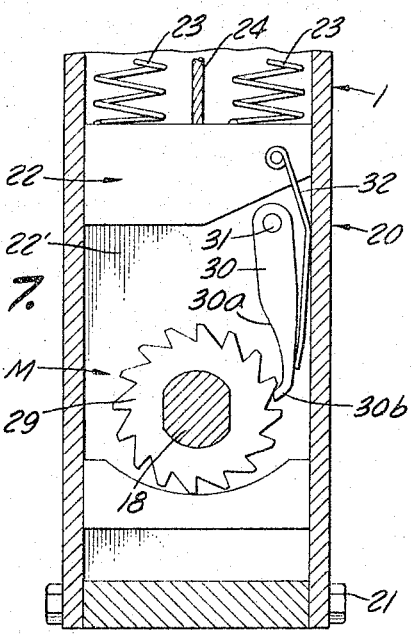
FIG. 7 is a fragmentary view corresponding to FIG. 6 with the parts in the actuator cocked and ready to be operated under the force of the spring means therein for actuating the brake adjusting means in the slack adjusting arm.

As shown in FIGS. 6 and 7, the operating means M in the housing 20 includes a ratchet wheel 29 mounted on the shaft 18 which latter extends from the arm 2 into the housing just sufficient to mount the ratchet wheel thereon. In this connection, it should be noted that in attaching the actuator unit 1 of this invention to the arm 2, the regular shaft 18 in the latter is removed and a substitute shaft 18 inserted, the latter being but slightly longer than the regular shaft so that one end thereof will extend from the arm 2 into the housing 20 as shown in FIG. 8.

The plunger 22 is in the form of a rectangular block having an elongate recess 22' in one side to accommodate the shaft 18 and ratchet wheel 29 and to permit of relative axial movement of the housing 20 and plunger. A pawl 30 is pivoted as at 31 on the plunger 22 and is biased by a leaf spring 32 so as to be engaged with the ratchet wheel at all times. The pawl 30 is formed with an elongate and arcuate face 30a leading to the hook end 30b and which will permit of free rotation of the ratchet wheel in either direction, while the plunger is in the predetermined position as shown in FIG. 6 adjacent one end of the housing as effected by the spring means 23. Moreover, this elongate face 30a of the pawl makes it possible for limited relative axial movement of the pawl and ratchet wheel to take place without causing the pawl to engage and rotate the ratchet wheel. However, it will be apparent with reference to FIG. 7 that when the flexible anchoring element 24 holds the plunger 22 against movement with the housing 20 while the latter moves with the arm 2 in applying and releasing the brakes when slack in the system permits of overtravel of the arm, the pawl 30 is disposed to engage the ratchet wheel and to turn it when the spring means 23 becomes effective to bias the plunger as the arm 2 moves in brake releasing direction.

With reference to the foregoing description and accompanying drawings, it will now be apparent that when slack occurs in the brake system due to wear on the brake shoes or to any other cause and the brake operating arm 2 moves beyond the usual extent for applying the brakes, the plunger 22 in the housing 1 and housing 20 will be relatively moved to the extent that on the return movement of the arm 2, the pawl and ratchet mechanism will operate the brake adjusting means in the arm 2.

The housing 20 may be of any suitable construction and as here shown has opposite sides thereof formed as portions of the cover plates 34 held by the fastenings 35 on opposite sides of the arm 2. These cover plates may be closely engaged with the remainder of the housing structure so as to prevent leakage of any lubricant that may be mounted in the housing. In this connection, a flexible boot 37 as shown in FIGS. 4 and 5 may be provided on the flexible anchoring element to form a seal preventing escape of lubricant from the interior of the housing.

It should be noted that the steel cable 24 is fixed to the plunger 22 in the manner and by the means shown in FIG. 8 wherein it will also be seen that the housing 20 is constructed to afford ready access to the connection of the cable with the plunger without requiring disassembling of the actuator. This makes it possible readily and easily to install a new cable or effect a new connection of the cable with the plunger should this be desired.

It should also be noted that the present invention may be embodied as a complete slack adjustor that is automatic in operation yet subject to manual adjustment or made up as an automatic actuator attachment subject to ready and easy combination with a known type of manually operable slack adjustor unit to render such unit automatic in operation.

While specific structural details have been shown and described, it should be understood that changes and alterations may be resorted to without departing from the spirit of the invention as defined in the appended claims.

I claim:

1. A brake adjusting device, comprising: a housing; means for mounting said housing for movement with the brake operating arm of a slack adjusting unit wherein said arm is moved in opposite directions for applying and releasing the brakes and is provided with brake adjusting means including a shaft rotatable for actuating said adjusting means; a plunger mounted in said housing so that said housing and plunger are relatively movable; spring means in said housing biasing said plunger to occupy a predetermined position; a flexible anchoring element connected to said plunger; means for anchoring said flexible element at a point spaced from said plunger; said flexible element holding said plunger against movement relative to said housing and releasing said plunger for movement relative to said housing into said predetermined position by said spring means in response to predetermined opposite movements of said arm in applying and releasing the brakes; and operating means in said housing operatively connected to said shaft and said plunger for effecting rotation of said shaft and operation of said brake adjusting means upon said relative movement of said plunger into said predetermined position by said spring means.

2. The brake adjusting device as set forth in claim 1, wherein said shaft is manually rotatable to operate said brake adjusting means independently of said operating means while said operating means is operatively connected with said shaft and said plunger is biased by said spring means to occupy said predetermined position.

3. The brake adjusting device as set forth in claim 1, wherein said housing is positioned on said arm adjacent one end of said shaft and the other end of said shaft is disposed to provide for rotation thereof to actuate said brake adjusting means while said operating means is disposed in said predetermined position.

4. The brake adjusting device as set forth in claim 1, wherein said means for anchoring said flexible element includes spring means of greater strength than said spring means in said housing.

5. The brake adjusting means as set forth in claim 1, wherein said housing is provided with an opening therein through which said flexible element extends to said plunger, and guide means on said housing adjacent said opening and through which said flexible element extends.

6. The brake adjusting means as set forth in claim 1, wherein said housing has an opening therein to permit a portion of said shaft to extend into the housing; said operating means in said housing including a ratchet wheel fixed on said shaft and a pawl on said plunger biased to contact said ratchet wheel.

7. The brake adjusting device as set forth in claim 6, wherein said ratchet wheel and said pawl are constructed and arranged to permit of rotation of said shaft and said ratchet wheel independently of said pawl in either direction while said plunger is in said predetermined position.

8. In combination with the brake operating arm of a slack adjustor unit wherein said arm is movable in opposite directions about an axis to apply and release brakes and carries interiorly thereof brake adjusting means including a shaft rotatable in either direction to actuate said adjusting means; a housing fixed on said arm for movement therewith; said housing having an opening therein through which a portion of said shaft extends into said housing; a plunger mounted in said housing so that the housing and plunger are relatively movable; spring means in the housing biasing said plunger to occupy a predetermined position; a flexible anchor element fixed to said plunger and extending outwardly from said housing; means for anchoring said flexible element at a point spaced from said housing; said anchoring element operating to hold said plunger against movement relative to said housing and to release said plunger in response to predetermined movements of said housing in the operation of said arm to apply and release the brakes; a ratchet wheel fixed on said portion of said shaft; a pawl pivoted on said plunger; and means biasing said pawl to engage said ratchet wheel so as to rotate said shaft and actuate said brake adjusting means in response to said plunger being moved into said predetermined position by said spring means following said release of said plunger.

9. The structure as set forth in claim 8, wherein said pawl is at all times in contact with said ratchet wheel and is formed to permit rotation of the ratchet wheel and shaft in either direction while said plunger occupies said predetermined position.

10. The structure as set forth in claim 8, wherein said anchoring means for said flexible element includes spring means of greater strength than said spring means for biasing said plunger.

11. The structure as set forth in claim 8 including fastening means detachably fixing said flexible anchor element to said plunger; and a formation in said housing affording access to said fastening means from the exterior of said housing.

12. An automatic brake adjustor, comprising: a brake operating arm adapted to be connected with means for applying and releasing vehicle brakes in response to movement of said arm about an axis; means mounting said arm for such movement; a shaft carried by said arm; adjusting means carried by said arm operable upon rotation of said shaft for adjusting the brakes associated with said arm; actuating means operable in response to movement of said arm about said axis for rotating said shaft to operate said adjusting means; said actuating means including a plunger; means reciprocally supporting said plunger on said arm; spring means biasing said plunger to occupy a predetermined position; a flexible anchoring element fixed to said plunger; means for anchoring said flexible element at a point spaced from said plunger with said flexible element operable to hold said plunger against movement and to release said plunger in response to predetermined movement of said arm in applying and releasing the brakes; a ratchet wheel fixed on said shaft; a pawl pivoted on said plunger; means biasing said pawl to engage said ratchet wheel so as to rotate said shaft and actuate said adjusting means in response to said plunger being moved into said predetermined position by said spring means following release of said plunger.

References Cited by the Examiner
UNITED STATES PATENTS

| 2,554,064 | 5/1951 | Shields | 188—79.5 |
| 3,121,478 | 2/1964 | Bostwick | 188—79.5 |

DUANE A. REGER, *Primary Examiner.*